US008639456B2

(12) United States Patent
Tsuchiya et al.

(10) Patent No.: US 8,639,456 B2
(45) Date of Patent: Jan. 28, 2014

(54) FLUID CONSUMPTION CALCULATION DEVICE, FLUID CONSUMPTION CALCULATION SYSTEM, AND FLUID CONSUMPTION CALCULATION METHOD

(75) Inventors: Yuichi Tsuchiya, Komoro (JP); Junji Hasegawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 175 days.

(21) Appl. No.: 12/849,740

(22) Filed: Aug. 3, 2010

(65) Prior Publication Data

US 2011/0035164 A1 Feb. 10, 2011

(30) Foreign Application Priority Data

Aug. 5, 2009 (JP) ................................ 2009-182188

(51) Int. Cl.
*G01F 1/00* (2006.01)

(52) U.S. Cl.
USPC ........... 702/45; 347/7; 347/9; 347/14; 347/19

(58) Field of Classification Search
USPC ................ 702/45, 117, 136; 347/7, 9, 14, 19; 358/1.15
See application file for complete search history.

(56) References Cited

U.S. PATENT DOCUMENTS 6,042,214 A * 3/2000 Minowa et al. ................. 347/23
6,789,867 B2 * 9/2004 Takahashi et al. .............. 347/12
7,280,258 B2 * 10/2007 Kitahara et al. .............. 358/501
7,701,599 B2 4/2010 Kumashio
2002/0191039 A1 12/2002 Minowa et al.
2003/0020951 A1 * 1/2003 Minowa et al. .............. 358/1.15
2003/0231328 A1 * 12/2003 Chapin et al. ................ 358/1.13
2009/0073202 A1 * 3/2009 Kanda et al. ...................... 347/9

FOREIGN PATENT DOCUMENTS

JP 11-348295 A 12/1999
JP 2002-215353 A 8/2002
JP 2002-318759 A 10/2002
JP 2002-370371 A 12/2002
JP 2004-090264 A 3/2004
JP 2005-212270 A 8/2005

* cited by examiner

*Primary Examiner* — Sujoy Kundu
*Assistant Examiner* — Harun Chowdhury
(74) *Attorney, Agent, or Firm* — Kilpatrick Townsend & Stockton LLP

(57) ABSTRACT

Technology enabling a user to easily acquire the result of calculating the consumption of fluid used in a fluid discharge device is provided. A fluid consumption calculation device that calculates consumption of a fluid includes an input unit that receives information related to an output object; a discharge control unit that generates discharge data for a fluid used to form the output object using a fluid discharge device; an analysis unit that analyzes the discharge data; a calculation unit that uses information acquired from the analysis unit to calculate consumption of the fluid used to form the output object; and an output unit that generates and outputs output information using information acquired from the calculation unit.

14 Claims, 7 Drawing Sheets

FLUID CONSUMPTION CALCULATION DEVICE, FLUID CONSUMPTION CALCULATION SYSTEM, AND FLUID CONSUMPTION CALCULATION METHOD

This application claims priority under 35 U.S.C. §119 to Japanese Patent Application No. 2009-182188 filed on Aug. 5, 2009, the entire disclosure of which is expressly incorporated by reference herein.

BACKGROUND

1. Technical Field

The present invention relates to a device and technology for calculating the consumption of fluid used in a fluid discharge device.

2. Related Art

When choosing an inkjet printer, ink consumption, print speed and print quality are equally essential considerations. Japanese Unexamined Patent Appl. Pub. JP-A-2005-212270, for example, teaches a system that can display how much ink has been consumed in an inkjet printer. Not much effort has really been made, however, to make determining ink consumption simple.

This problem of determining fluid consumption is not limited to inkjet printers and other types of printers, and is common to fluid discharge devices including textile printers for printing a pattern on fabric, color filter production systems, systems for manufacturing displays such as organic electroluminescent displays, and DNA chip fabrication systems that coat a chip with a DNA solution to manufacture DNA chips.

At least of one embodiment of the present invention relates to technology enabling a user to easily acquire the result of calculating the consumption of fluid used in a fluid discharge device.

SUMMARY

At least of one embodiment of the invention is directed to solving at least part of the foregoing problem, and various embodiments and applications of the invention are described below.

A first aspect of the invention is a fluid consumption calculation device that calculates consumption of a fluid used in a fluid discharge device, the fluid consumption calculation device including: an input unit that accepts input of information related to an output object (such as an image when the fluid discharge device is a printer) that is formed by the fluid discharge device; a discharge control unit that generates discharge data for a fluid used to form the output object using the fluid discharge device; an analysis unit that analyzes the discharge data; a calculation unit that uses information acquired from the analysis unit to calculate consumption of the fluid used to form the output object using the fluid discharge device; and an output unit that generates and outputs output information for reporting fluid consumption information using information acquired from the calculation unit.

With this aspect of the invention, input of information about an output object is received from the input unit, processes are executed by various parts of the fluid consumption calculation device, and output information generated as fluid consumption information for the fluid discharge device is output from the output unit. More specifically, because the user can acquire the output information by inputting information about the output object from the input unit, the calculated result of the consumption of fluid used by the fluid discharge device can be easily acquired. This analysis includes, for example, acquiring information including the fluid discharge count from the discharge data, and is specific to a particular fluid discharge device.

A second aspect of the invention is the foregoing fluid consumption calculation device wherein the discharge control unit generates discharge data of fluid used to form the output object for each of plural different fluid discharge devices; and the analysis unit analyzes the discharge data using analysis information corresponding to each of the fluid discharge devices.

This aspect of the invention can calculate how much fluid is used by each of a plurality of different fluid discharge devices. As a result, the usefulness of the fluid consumption calculation device can be improved.

A third aspect of the invention is the first aspect of a fluid consumption calculation device wherein the input unit receives information for the fluid discharge device about a condition used when forming the output object; and the discharge control unit generates the discharge data based on said condition.

This aspect of the invention can calculate fluid consumption based on the discharge data generated according to specific conditions. As a result, the user of the fluid consumption calculation device can acquire more accurate fluid consumption calculation information.

A fourth aspect of the invention is the first aspect of a fluid consumption calculation device that also has an operating condition input unit that receives information about an operating condition of the fluid discharge device. The calculation unit uses information acquired from the analysis unit to recalculate (again calculate) consumption of the fluid used to form the output object under the operating condition each time operating condition information is received; and the output unit re-generates (again generates) information for reporting the recalculated result.

Each time the operating condition input unit receives operating condition input, this aspect of the invention recalculates fluid consumption under the new operating conditions. As a result, the user of the fluid consumption calculation device can acquire fluid consumption information based on the operating conditions used by the fluid discharge device.

A fifth aspect of the invention is the fourth aspect of a fluid consumption calculation device wherein the fluid discharge device has a fluid discharge unit that discharges fluid while moving bidirectionally; the operating condition includes at least information determining a time interval at which the output object is formed in the fluid discharge device; the analysis unit calculates a fluid discharge count and fluid discharge unit roundtrip count required to form the output object by analyzing the discharge data; and the calculation unit calculates a cleaning and flushing count of the fluid discharge unit determined from the fluid discharge count and fluid discharge unit roundtrip count, and calculates fluid consumption based on the fluid discharge count.

This aspect of the invention calculates the cleaning and flushing counts of the fluid discharge device, and calculates fluid consumption based on the fluid discharge count. As a result, the user of the fluid consumption calculation device can acquire accurate fluid consumption information.

A sixth aspect of the invention is the fluid consumption calculation device according to the first aspect that also has a command unit that instructs the discharge control unit to generate discharge data for the output object.

In this aspect of the invention the discharge control unit generates the discharge data when instructed by the command unit, and the command unit can therefore execute a desired process separately from the discharge data generation process of the discharge control unit. As a result, the extensibility of processes that can be executed in the fluid consumption calculation device can be improved.

A seventh aspect of the invention is the fluid consumption calculation device according to the first aspect wherein the output object is an image; and the output information includes an expected output image representing the result expected when the output object is formed by the fluid discharge device.

Because the output information includes the expected output image in this aspect of the invention, the user can compare the image of the output object with the expected output image. The convenience of the fluid consumption calculation device can thus be improved.

An eighth aspect of the invention is the fluid consumption calculation device according to the first aspect wherein the discharge control unit includes a printer driver.

This aspect of the invention enables generating discharge data easily using a printer driver.

Another aspect of the invention is a fluid consumption calculation system that calculates consumption of a fluid, and has a first device and a second device. The first device includes an input unit that receives information related to an output object, a calculation unit that corresponds to a fluid discharge device, and calculates consumption of a fluid when forming the output object, and an output unit that generates and outputs output information using information acquired from the calculation unit. The second device includes a command unit that corresponds to the fluid discharge device and instructs generating discharge data of the fluid used to the output object, a discharge control unit that generates the discharge data based on a command from the command unit, and an analysis unit that analyzes the discharge data. The first device sends received information related to the output object to the second device, and requests starting a process on the second device. The command unit of the second device instructs the discharge control unit to generate the discharge data based on the process start request, and the analysis unit analyzes the discharge data and sends the result to the first device. The calculation unit of the first device that received the result of analysis calculates the fluid consumption using said analysis result.

With this aspect of the invention a first device including an input unit, calculation unit, and output unit, and a second device including a command unit, discharge control unit, and analysis unit, calculate fluid consumption. As a result, the security of the second device can be improved.

The invention can be embodied in various ways. For example, in addition to a fluid consumption calculation device, fluid consumption calculation system, and fluid consumption calculation method that calculate consumption of a fluid used in a fluid discharge device, the invention can also be rendered as a computer program that renders the method or device functions described herein, and as a storage medium that records the computer program.

Other objects and attainments together with a fuller understanding of the invention will become apparent and appreciated by referring to the following description and claims taken in conjunction with the accompanying drawings.

DESCRIPTION OF EMBODIMENTS

Preferred embodiments of the present invention are described below with reference to the accompanying figures.

A. Embodiment 1

Figure 1:
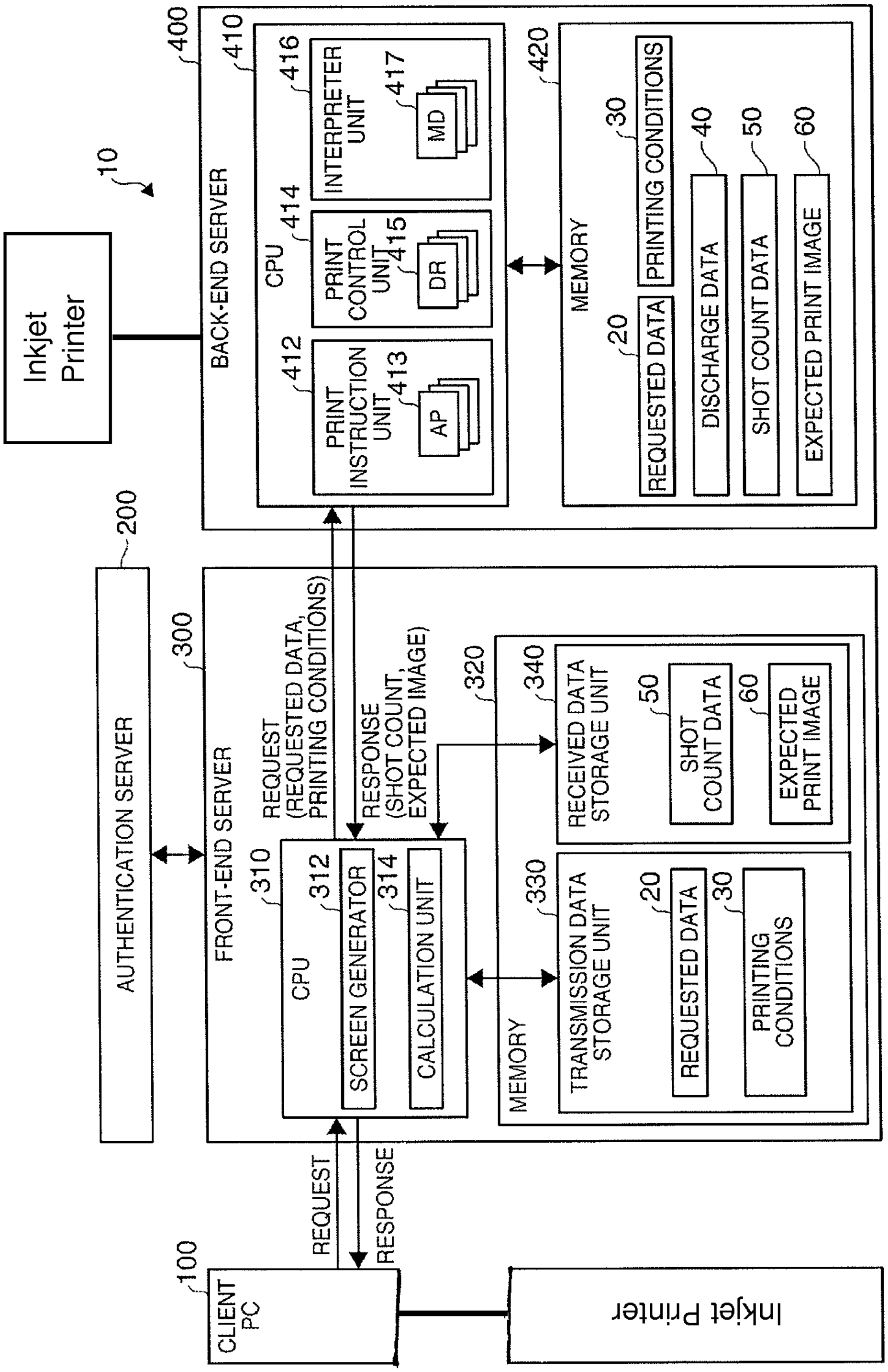
FIG. 1 is a block diagram of an ink consumption calculation system according to a first embodiment of the invention.

FIG. 1 schematically describes an ink consumption calculation system according to a first embodiment of the invention. This ink consumption calculation system 10 includes a authentication server 200, front-end server 300, and back-end server 400. The client PC 100 is connected through a network to the ink consumption calculation system 10, and is a client terminal of the ink consumption calculation system 10. Users of the ink consumption calculation system 10 include, for example, the operator that provides an ink consumption guidance service in response to customer requests, as well as customers and general users.

The client PC 100 may be a personal computer that can connect to the network. The authentication server 200 has a function for verifying in response to a request whether the user is authorized to use the ink consumption calculation system 10, and returning the authentication result. An LDAP (Lightweight Directory Access Protocol) server, for example, can be used as the authentication server 200. Note that this authentication server 200 can also be omitted. However, because users of the ink consumption calculation system 10 may include customers and the general public, for security purposes the authentication server 200 is preferably not omitted.

The front-end server 300 exchanges information directly with the client PC 100 through a network interface not shown.

The front-end server 300 includes a CPU 310 and memory 320. The CPU 310 is a control circuit for controlling other parts of the front-end server 300, and includes a screen generator 312 and calculation unit 314. The screen generator 312 provides a graphical user input terminal (GUI) for inputting and outputting information between the front-end server 300 and client PC 100.

The calculation unit 314 has a function for calculating ink consumption using shot count data 50. In an inkjet printer having an inkjet head as a fluid discharge device, this shot count data 50 is information indicating the ink discharge count. Note that below an inkjet printer is referred to as simply a printer.

The memory 320 may be rendered using a hard disk drive, flash memory, ROM, RAM, or other type of storage device, and includes a transmission data storage unit 330 and a received data storage unit 340. The transmission data storage unit 330 is a storage area for temporarily storing information input from the client PC 100 at least until the process executed by the ink consumption calculation system 10 ends. Request data 20 and printing conditions 30 are stored in the transmission data storage unit 330. The request data 20 includes output files to be rendered (printed) by the printer (these output files are also referred to below as the "base data"), and information about the ink consumption calculation system 10 user.

The printing conditions 30 are the output conditions that are used when the base data is printed by the printer.

The received data storage unit 340 is a storage area for temporarily storing information received from the back-end server 400 at least until the process executed by the ink consumption calculation system 10 ends. The shot count data 50 and expected print image 60 are stored in the received data storage unit 340. The expected print image 60, which is the expected output image, is the expected result of printing the base data on the printer.

The back-end server 400 is a server that receives and processes requests from the front-end server 300 through a network interface not shown. The back-end server 400 includes a CPU 410 and memory 420.

The CPU 410 is a control circuit for controlling other parts of the back-end server 400, and includes a print instruction unit 412, print control unit 414, and analysis unit 416.

The print control unit 414 includes printer drivers 415 (DR) for a plurality of different printers. The print control unit 414 has a function for generating discharge data for printing the base data on a printer using the corresponding printer driver 415. This discharge data is the control data sent to the printer from the printer driver for printing, and is stored as a file. Note that this control data includes raster data specifying the on/off state of a dot for each pixel, and subscanning feed pitch data specifying the feed distance in the subscanning direction. The discharge data generated by the print control unit 414 is stored as the discharge data 40 in memory 420.

The print instruction unit 412, which is an example of an instruction unit, includes a plurality of applications 413 (AP). The print instruction unit 412 has a function for instructing the print control unit 414 to generate discharge data. The analysis unit 416 includes analysis modules 417 (MD) for a plurality of different printers. The analysis unit 416 has a function for analyzing the discharge data 40 generated by the print control unit 414 using an analysis module 417 as described in detail below.

The memory 420 may be rendered using a hard disk drive, flash memory, ROM, RAM, or other storage device not shown. The memory 420 is a storage area for temporarily storing information required by an ink consumption calculation system 10 process until the process is completed. This required information includes the discharge data 40, printing conditions 30, and request data 20 contained in requests received from the front-end server 300. Note that the discharge data 40 is generated from the base data contained in the request data 20.

The back-end server 400 receives request data 20 and printing conditions 30 sent from the front-end server 300, and based thereon executes a virtual printing process simulating the printer. While nothing is actually printed, the discharge data required for the printer to print is generated, and the expected output image is generated instead of actually printing the image. The ink shot count, for example, is also generated based on the discharge data at this time.

Figure 2:
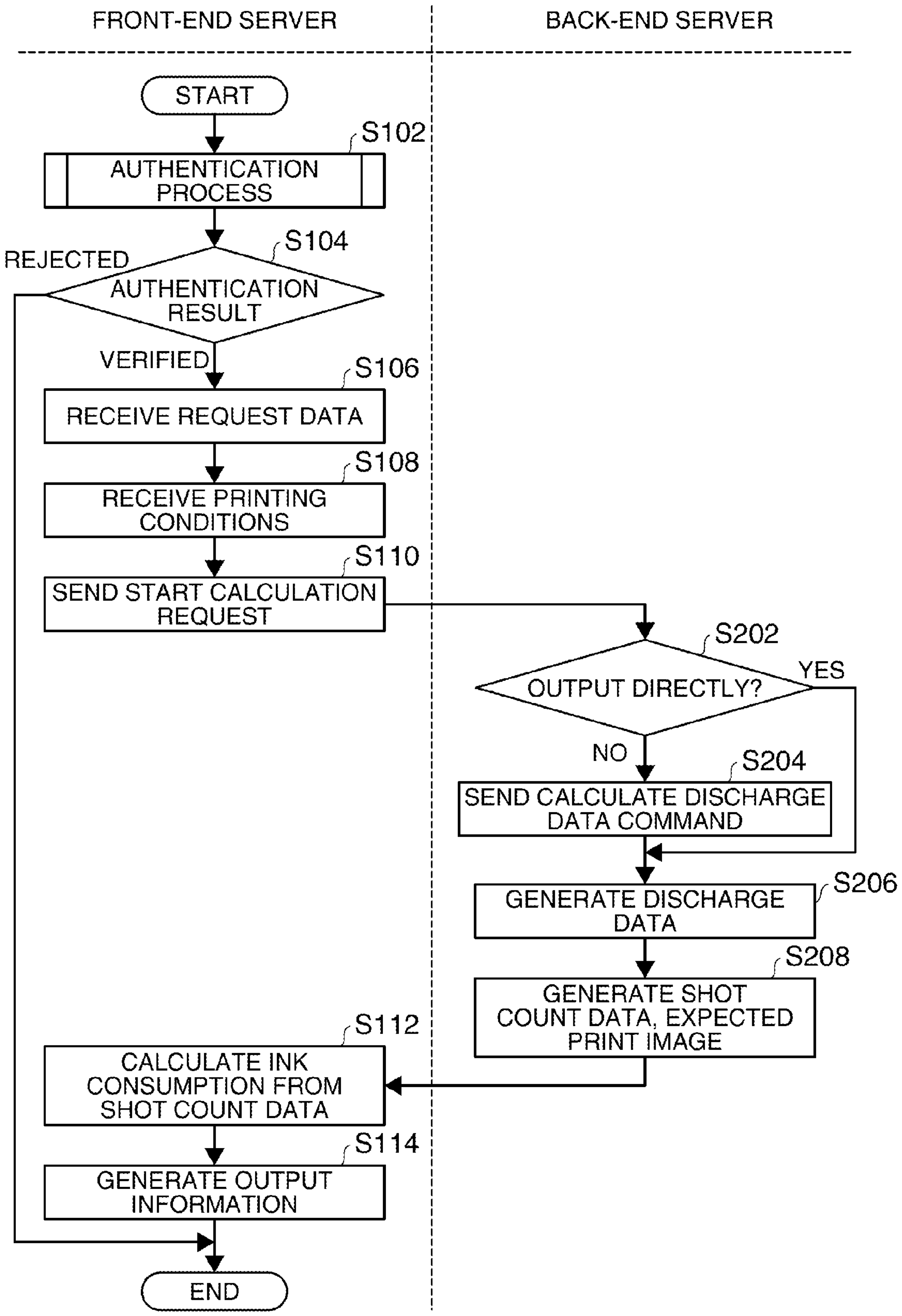
FIG. 2 is a flow chart of a process executed by the ink consumption calculation system.

FIG. 2 is a flow chart of the ink consumption calculation system processes. Note that the steps executed by the front-end server 300 and the steps executed by the back-end server 400 are shown separately in FIG. 2.

The user first starts a web browser previously installed on the client PC 100 and enters the URL of the front-end server 300. The client PC 100 sends a request to start the process of the ink consumption calculation system to the front-end server 300.

After receiving the request from the client PC 100, the front-end server 300 executes the authentication process in step S102. This authentication process determines whether or not the user name and password input from the client PC 100 through the front-end server 300 matches the user name and password combination previously stored in a storage area not shown in the authentication server 200. If the input user name and password match the user name and password combination previously stored in a storage area not shown in the authentication server 200, authentication is confirmed; if they do not match, access is denied. If the front-end server 300 cannot be authenticated in step S104, the process ends.

However, if the front-end server 300 is authenticated in step S104, control goes to the next step.

Because ink consumption can be known by this ink consumption calculation system 10, billing and cost estimation can also be enabled if the price per unit of ink consumption is also stored. As a result, authentication can improve security, and is effective when the ink consumption calculation system 10 is used in a billing system.

Figure 3:
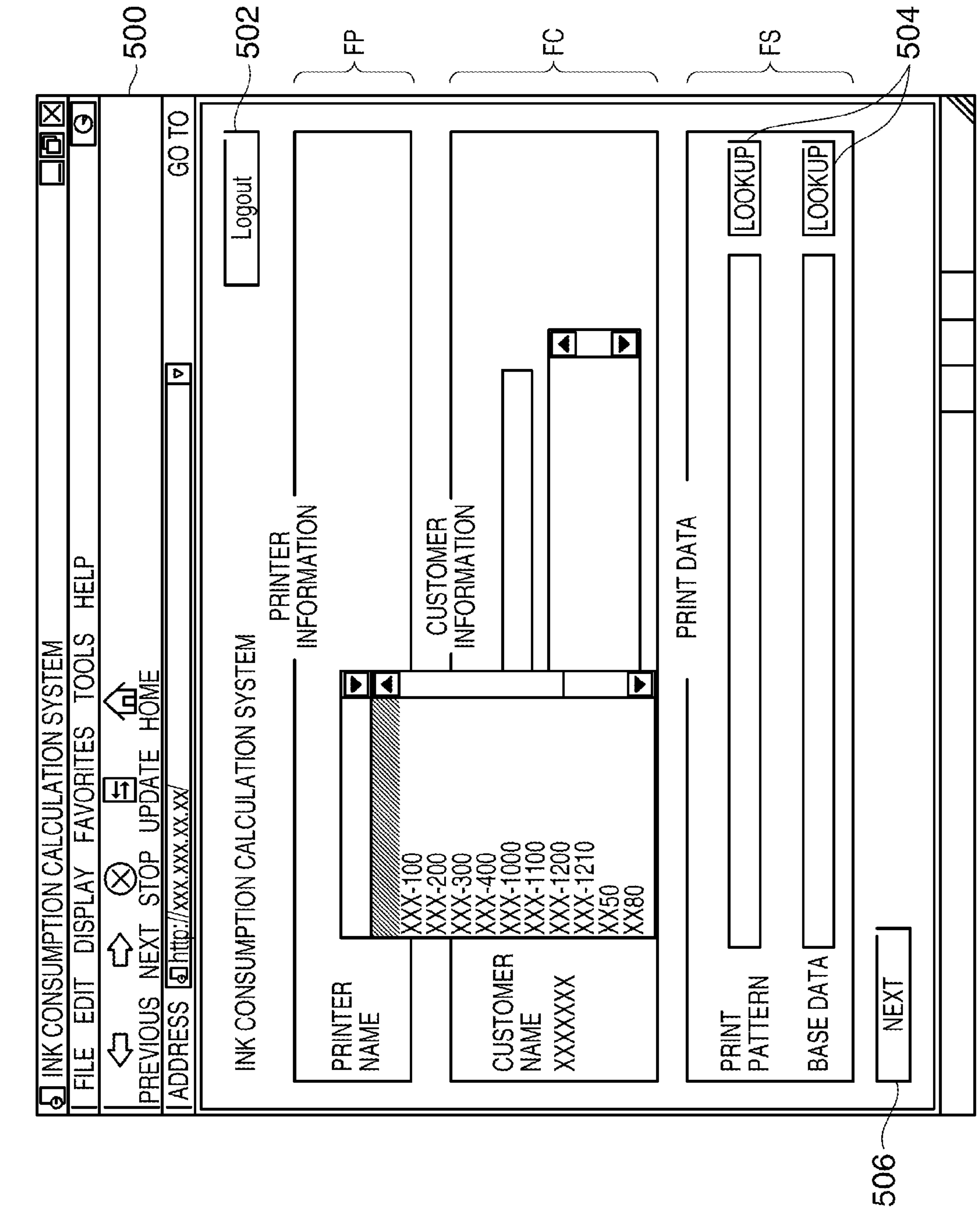
FIG. 3 shows an example of the basic information input window displayed in step S106.

FIG. 3 shows an example of a basic information input window 500 that is displayed in step S106. In step S106 in FIG. 2, the screen generator 312 of the front-end server 300 used here as the input unit presents the basic information input window 500 on the display not shown of the client PC 100. More specifically, the screen generator 312 generates and sends the information to be display on the screen (such as an HTML file) to the client PC 100. The client PC 100 that received this information then updates the displayed information based on this received information.

The basic information input window 500 includes a printer information input field FP, a customer information input field FC, a print data input field FS, a logout button 502, and next button 506.

The logout button 502 logs the user out of the ink consumption calculation system 10, and terminates the current communication session between the client PC 100 and front-end server 300. The printer name can be specified in the printer information input field FP. In this embodiment of the invention the user selects the name of the printer for which ink consumption is to be calculated from a list of names presented in a drop-down list. Printing conditions 30 unique to the selected printer are determined based on the selected printer name. Printing conditions for each selectable printer name are previously stored in memory 420.

A customer name input box is provided in the customer information input field FC. The customer's name is entered in the customer name input box. Places for entering other desirable customer information (such as telephone number or address) may also be provided in the customer information input field FC.

A print pattern input box, a base data input box, and two lookup buttons 504 are provided in the print data input field FS. The discharge data described above can be entered directly into the print pattern input box. The output file to be rendered by the printer can be specified in the base data input box. The base data enables selecting, for example, a bit-mapped image data file or a data file prepared by a word processing application. The lookup buttons 504 present a lookup window to help the user select the print pattern and base data stored in the client PC 100. Note that the print pattern input box may be omitted.

The next button 506 proceeds to the next step in the process. When the next button 506 is pressed, the screen generator 312 stores the content specified in the printer information input field FP, customer information input field FC, and print data input field FS as the request data 20 in the transmission data storage unit 330. The screen generator 312 then goes to step S108 in FIG. 2. Note that the user does not need to enter information in all of the foregoing input boxes, and some information may be omitted. The parameter corresponding to any empty input box simply not specified in the printing conditions. Alternatively, a preset default value may be used for any parameter not specified by the user in an input box. Input values may also be separated into required items and optional items.

Figure 4:
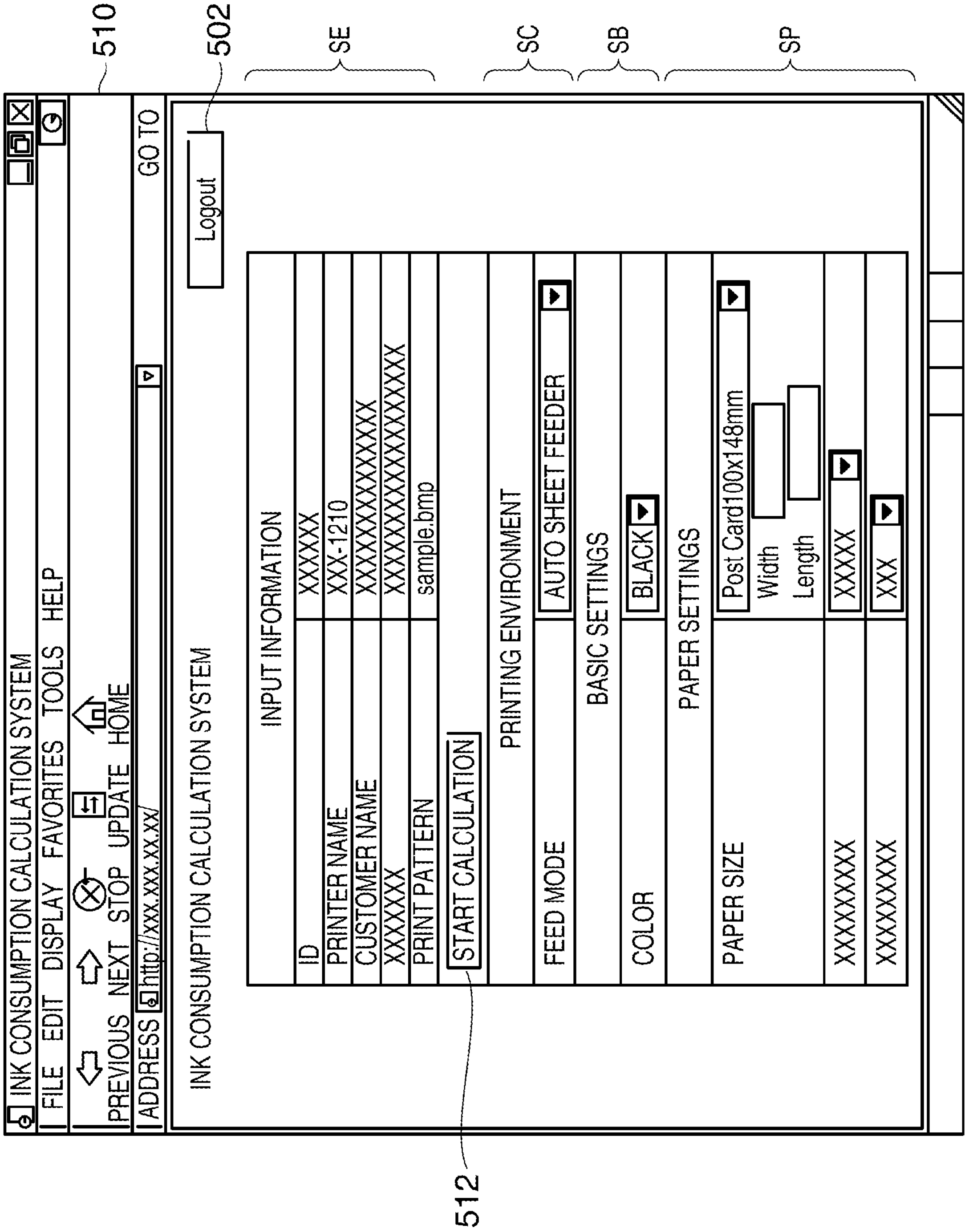
FIG. 4 shows an example of the print conditions input window displayed in step S108.

FIG. 4 shows an example of the print conditions input window 510 presented in step S108. In step S108 in FIG. 2, the screen generator 312 of the front-end server 300 used here as the input unit displays the print conditions input window 510 on the client PC 100. This window is displayed as described with reference to FIG. 3.

The print conditions input window 510 includes a basic information display box SE, a printing environment input box SC, a basic configuration input box SB [SC, sic], a media selection box SP, a logout button 502, and a start calculating button 512.

Included in the basic information display box SE are an ID display field, a printer name display field, a customer name display field, and a print pattern display field. A unique identifier that is assigned by the front-end server 300 to identify a particular process is displayed in the ID display field. The printer name specified in the printer information input field FP of the basic information input window 500 (FIG. 3) is displayed in the printer name display field. The customer name specified in the customer information input field FC in the basic information input window 500 is displayed in the customer name display field. The file name of the print pattern specified in the print data input field FS in the basic information input window 500 is displayed in the print pattern display field.

A feed mode selection field is provided in the printing environment input box SC. The print medium supply method of the printer is selected from a drop-down list in the feed mode selection field. An automatic sheet feeder is selected as the feed mode in the example shown in FIG. 4.

A color selection field is provided in the basic configuration input box SB. The print color used in the printer can be selected from a drop-down list in the color selection field. Black is selected in the example shown in FIG. 4.

A paper size selection field is provided in the media selection box SP. The size of paper (print medium) used in the printer can be selected from a drop-down list in the paper size selection field. The width and length of the print medium can also be input directly instead of selecting the paper size from a drop-down list. A postcard size (100×148 mm) is selected in the example shown in FIG. 4. Options for entering other print media information, such as the type of paper or application, may also be provided in the media selection box SP.

The start calculating button 512 goes to the next step in the process. When the start calculating button 512 is pressed, the screen generator 312 stores the content specified in the printing environment input box SC, the basic configuration input box SB, and the media selection box SP as the printing conditions 30 in the transmission data storage unit 330. The screen generator 312 then goes to step S110 in FIG. 2. Note that as described in FIG. 3, the user does not need to enter information in all of the input fields, and inputting only some information is also possible.

In step S110 in FIG. 2 the screen generator 312 of the front-end server 300 sends a start calculation request to the back-end server 400. The screen generator 312 also sends the request data 20 and printing conditions 30 stored in the transmission data storage unit 330 with the start calculation request.

The back-end server 400 receiving the request temporarily stores the request data 20 and printing conditions 30 in memory 420. Then in step S202, the back-end server 400 determines whether or not to output discharge data directly by the print control unit 414 based on the type of base data contained in the received request data 20. More specifically, if bitmapped data is received, for example, the print control unit 414 outputs directly. If data prepared by a word processor application installed on the client PC 100 is received, the print control unit 414 does not output directly. Control goes to step S206 if the data is output directly.

If data is not output directly, the print instruction unit 412 used here as an output instruction unit controls generating discharge data (step S204). The print instruction unit 412 that received the base data sends a print request to the print control unit 414 through an application 413 of a type corresponding to the base data type.

In step S206, the print control unit 414 operating as a discharge control unit generates discharge data. Using a printer driver 415 for the printer based on the printer name contained in the received request data 20, the print control unit 414 generates control data for printing the base data file according to the conditions specified in the printing conditions 30. The print control unit 414 then stores this control data directly as the discharge data 40 in memory 420. The print control unit 414 can thus output discharge data for printing output files on plural different printers. Note that when a print pattern file is selected in the request data 20, steps S202 to S206 can be omitted.

Next in step S208 the analysis unit 416 generates shot count data and the expected print image. Using an analysis module 417 for the selected printer according to the conditions specified in the printing conditions 30 and the printer name contained in the received request data 20, the analysis unit 416 analyzes the drive signals contained in the control data of the discharge data 40 and counts the head shot count (fluid discharge count) of the inkjet head of the printer, and if the inkjet head is carried on a carriage and discharges ink while traveling bidirectionally, the roundtrip count of the inkjet head (the number times the fluid discharge unit travels bidirectionally). The head shot count includes the total number of shots from all nozzles of the inkjet head.

The analysis unit 416 stores the resulting head shot count and roundtrip count of the inkjet head as the shot count data 50 in memory 420. The analysis unit 416 thus uses an analysis module 417 corresponding to the printer driver 415 used when the discharge data 40 is generated to analyze the discharge data 40.

Then, using the same analysis module 417, the analysis unit 416 converts the discharge data 40 to an image, and generates an expected output image representing the expected result of printing using the printer indicated by the printer name contained in the received request data 20. The analysis unit 416 stores this expected output image as the expected print image 60 in memory 420. The analysis unit 416 then sends response data containing the shot count data 50 and expected print image 60 to the front-end server 300.

The calculation unit 314 receives this response data and temporarily stores the shot count data 50 and expected print image 60 in the received data storage unit 340. The calculation unit 314 then calculates the ink consumption in step S112. More specifically, using the printer name contained in the request data 20 stored in the transmission data storage unit 330, the roundtrip count of the carriage carrying the inkjet head contained in the received shot count data 50 according to the conditions specified in the printing conditions 30, and the print time interval (the time interval between output) that is stored as a default value, the calculation unit 314 calculates the cleaning count and flushing count for preventing clogged nozzles and recovering from clogged nozzles in the inkjet head of the printer. This is because if the time between printing operations is long, ink inside the inkjet head can thicken and clog the nozzles, and cleaning to suction ink from the inkjet head, and flushing to discharge ink from the inkjet head, are therefore performed at specified time intervals. Ink consumption is then calculated using this cleaning count, flushing count, and the head shot count contained in the received shot count data 50. This calculation is done based on a formula previously stored in calculation unit 314.

Ink consumption is thus calculated based on the result of analyzing the discharge data generated according to the printing conditions, the cleaning and flushing counts of the printer, and the head shot count. As a result, the user can acquire the accurate ink consumption. In addition, because the print control unit 414 generates the discharge data according to instructions from the print instruction unit 412, the print instruction unit 412 could execute a different process than the foregoing discharge data generation process. This configuration improves the extensibility of processes that can be executed on the ink consumption calculation system 10. This also enables calculating only the discharge data that is actually used for printing, and does not include the cleaning count and flushing count that are not directly used to print.

Figure 5:
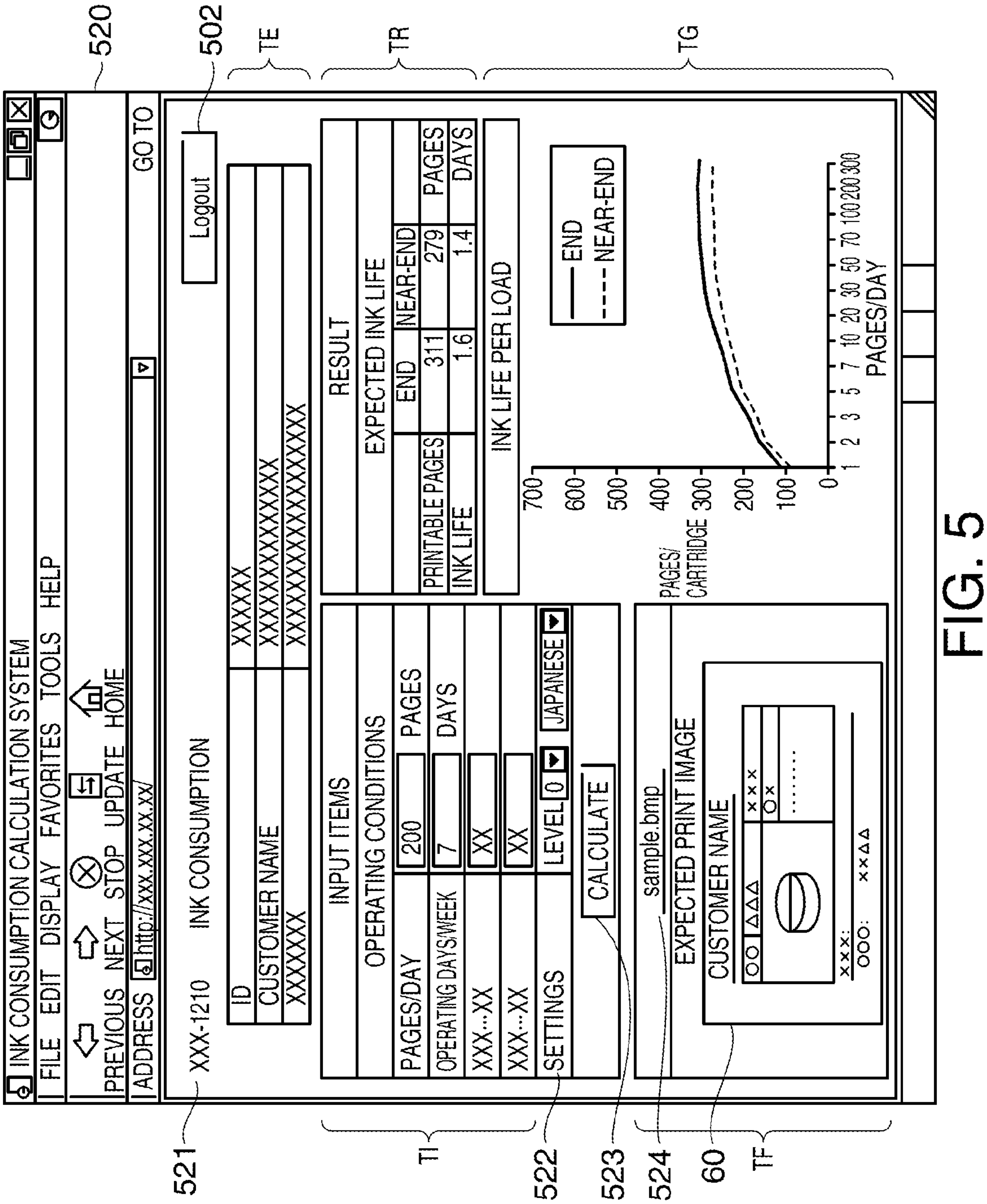
FIG. 5 shows an example of the consumption display window presented in step S114.

FIG. 5 shows an example of the consumption display window 520 presented in step S114. In step S114 in FIG. 2 the screen generator 312 of the front-end server 300 operating as an output unit generates and presents output information in a consumption display window 520 presented on a display not shown of the client PC 100. This output information is information for reporting the information acquired by the calculation unit 314. Note that the method of displaying the window is the same as described with reference to FIG. 3.

The consumption display window 520 includes a printer name display field 521, a logout button 502, a basic information display field TE, an operating conditions input field TI, an expected ink life display field TR, an image display field TF, and an ink life per load display field TG.

The printer name specified in the printer information input field FP of the basic information input window 500 (FIG. 3) is displayed in the printer name display field 521.

An ID display field and a customer name display field are included in the basic information display field TE. The information displayed in these fields is the same as described in FIG. 4. Display fields for displaying other necessary information can also be provided in the basic information display field TE.

A print count field and an operating days field are provided in the operating conditions input field TI used here as an example of an operating conditions input unit. The number of pages printed per day is entered in the print count field. The number of days per week that the printer is used is entered in the operating days field. In the example shown in FIG. 5, the printer is set to be operated 7 days per week.

Fields for entering other information related to operating conditions (such as the number of work hours per day) may also be provided in the operating conditions input field TI. The operating conditions describing the conditions in which the printer is used can thus be entered in the operating conditions input field TI. Note that when the consumption display window 520 is displayed first on the client PC 100, default values may be pre-entered into the fields of the operating conditions input field TI.

A level input field and language input field are provided in a settings input field 522. The display level of the consumption display window 520 is specified in the level input field. For example, if level 0 is specified, only basic items such as shown in FIG. 5 are displayed. The number of items displayed in each field of the consumption display window 520 can be increased by increasing the level to 1, 2, 3, and so forth. The display language of the consumption display window 520 can be selected in the language field.

Display areas for a base data link 524 and the expected print image 60 are provided in the image display field TF. The base data link 524 is an HTML link. When the user clicks this link, the data file (such as an image or document) selected as the base data (output file) is displayed in a separate window.

The expected print image 60 is a thumbnail version of the expected print image 60 stored in the received data storage unit 340. Note that this thumbnail image could be a link that when clicked by the user causes the original expected print image 60 in a separate window instead of a reduced thumbnail image.

As described above, because the image display field TF includes the base data selected for output and an expected print image 60 as the expected output image, the user can compare the selected output file and the expected output image. The printing conditions can also be changed to achieve the desired expected output image. As a result, the usability and convenience of the ink consumption calculation system 10 can be improved.

Information representing the ink consumption calculated by the calculation unit 314 in step S112 in FIG. 2 is displayed in the expected ink life display field TR. In this embodiment of the invention ink consumption is expressed using the number of pages that can be printed per cartridge (the number of pages until the cartridge is depleted, or the number of pages until the cartridge is nearly depleted), and the number of days to the expected ink life per cartridge (the number of pages until the end of the ink life, or the number of pages until near the end of the ink life). Note that the information denoting ink consumption is not limited to the foregoing, and may be displayed in other terms, such as the amount of ink used for one printing operation, or the number of cartridges used to print a large quantity or for a long time. Ink consumption per color of ink can also be displayed.

Other information showing the ink consumption calculated by the calculation unit 314 in step S112 in FIG. 2 is displayed in the ink life per load display field TG. This embodiment of the invention displays a graph showing the number of pages printed per day on the x-axis and the number of pages printed per cartridge on the y-axis. The curve shown in this graph relates to the cleaning count and the flushing count of the printer that were determined from the print time interval (FIG. 4). The cost of the consumed ink can also be displayed by multiplying the ink consumption by an amount per ink unit.

When the user changes some condition in the operating conditions input field TI and presses the calculate button 523, the ink consumption calculation system 10 can be forced to recalculate the ink consumption. When the calculate button 523 is pressed, the calculation unit 314 receives the operating conditions specified in the operating conditions input field TI, and calculates the print time interval based on the page count and operating days values in the operating conditions input field TI. Input values other than the values input to the page count and operating days fields can also be used to calculate the print time interval. After calculating the print time interval, the calculation unit 314 recalculates the cleaning count and flushing count of the printer using the printer name contained in the request data 20 of the transmission data storage unit 330, the roundtrip count of the inkjet head contained in the shot count data 50 of the received data storage unit 340, and the calculated print time interval Ink consumption is then calculated using the count, flushing count, and the head shot count contained in the shot count data 50 of the received data storage unit 340.

After calculating the ink consumption, the screen generator 312 as the output unit regenerates the output information based on the new calculated result, and redisplays the consumption display window 520 on a display not shown of the client PC 100. This process of recalculating and redisplaying is executed each time the calculate button 523 is pressed (in other words, each time the operating conditions input field TI as the environment conditions input unit receives operating condition input). The ink consumption calculation system 10 thus recalculates ink consumption according to the current operating conditions each time operating condition input is received. As a result, the user can determine ink consumption based on the conditions under which the printer is actually used.

The generated output information is thus output from the output unit after base data denoting the output file is received from the screen generator 312 as an input unit, and processes are executed by various parts (the print instruction unit 412, print control unit 414, analysis unit 416, calculation unit 314) of the ink consumption calculation system 10. More specifically, the user can acquire the output information (consumption display window 520) by inputting the output object (base data) from the screen generator 312. As a result, the user can easily and quickly get the calculated result of ink consumption by the printer.

By using the foregoing configuration, the ink consumption calculation process executed by the ink consumption calculation system 10 also remains unknown to the user. As a result, if confidential data is used in the ink consumption calculation process, the security of the confidential data can be assured. Security is better than when using a spreadsheet application.

The print control unit 414 of the ink consumption calculation system 10 includes printer drivers 415 for a plurality of different printers. As a result, ink consumption can be calculated for a plurality of different printers, and convenience can thus be improved. Yet further, because these plural printer drivers 415 can be centrally administered by the back-end server 400, updating the printer drivers and other maintenance tasks are easier. Different printers can thus be compared to see if ink consumption and cost can be reduced, for example.

The ink consumption calculation system 10 according to this embodiment of the invention calculates ink consumption using a front-end server 300 including an input unit, calculation unit, and output unit, and a back-end server 400 including an output command unit, discharge control unit, and analysis unit. As a result, the back-end server 400 can be connected to an internal network, for example, to improve security. Furthermore, because the user can access and use the ink consumption calculation system 10 using a browser previously installed to the client PC 100, a specific software environment does not need to be provided for the client PC 100, and convenience can be improved.

B. Embodiment 2

Figure 6:
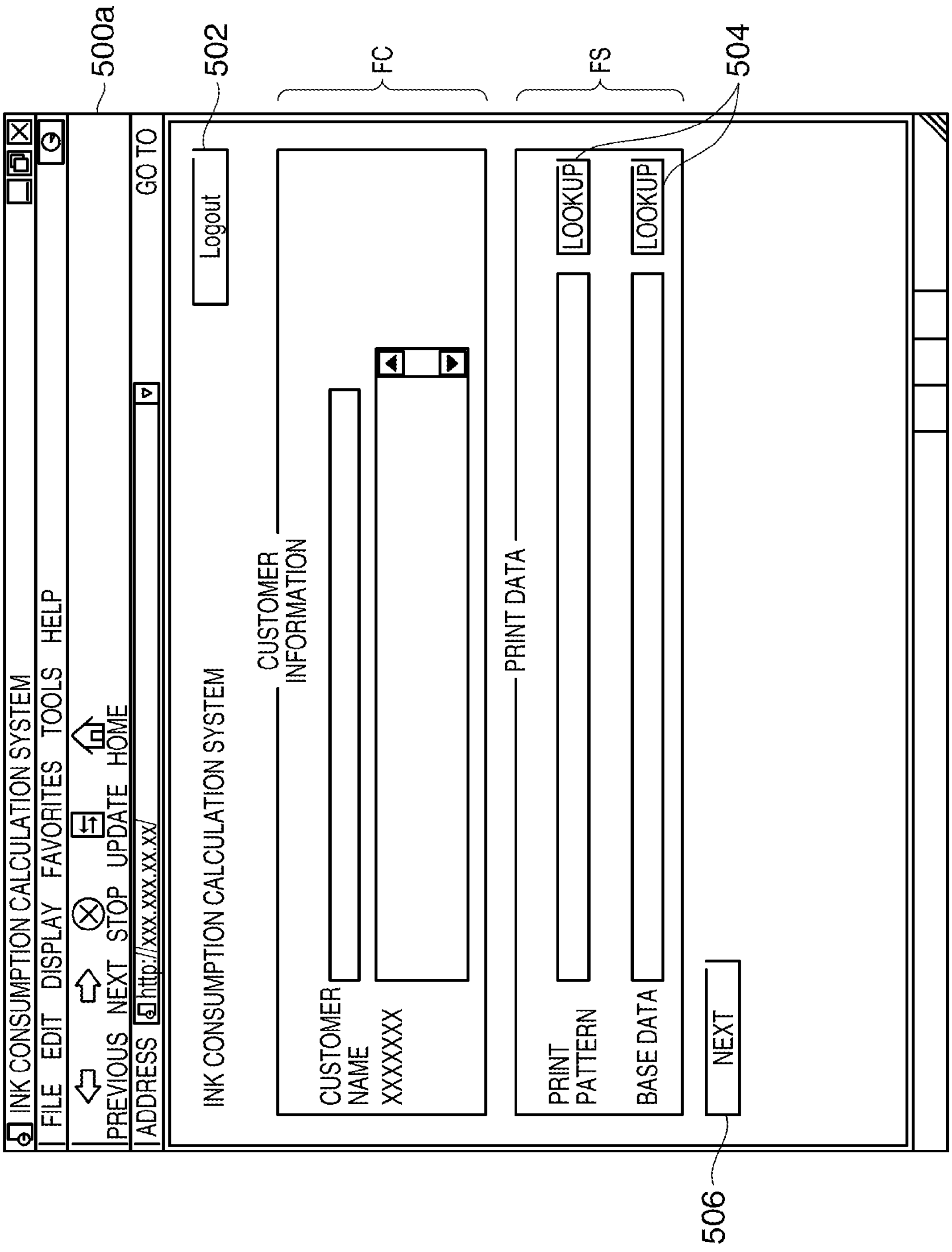
FIG. 6 shows an example of the basic information input window in a second embodiment of the invention.

FIG. 6 shows an example of the basic information input window 500*a* in a second embodiment of the invention. This embodiment differs from the first embodiment shown in FIG. 3 only in that the printer information input field FP is not provided, and except for this difference the configuration and operation of the second embodiment are the same as the first embodiment.

When the next button 506 is pressed in this second embodiment, the screen generator 312 stores the content input to the customer information input field FC and print data input field FS as the request data 20 in the transmission data storage unit 330.

For all of the printer drivers 415 installed in the print control unit 414, the print control unit 414 generates control data for printing the base data file according to the conditions specified in the printing conditions 30 using each of the printer drivers 415 in step S206 in FIG. 2. Before storing the control data for each of the plural printer drivers 415 as the discharge data 40 in the memory 420, the print control unit 414 adds information enabling identifying the printer driver that was used to generate the control data produced using each printer driver 415.

For each of the control data units contained in the discharge data 40, the analysis unit 416 analyzes the drive signals in the control data corresponding to each analysis module 417 using analysis modules 417 for all of the printers in the analysis unit 416 in step S208 in FIG. 2. After counting the head shot count and the roundtrip count of the inkjet head, information enabling identifying which analysis module was used is added and the data is then stored as shot count data 50 in the memory 420. The analysis unit 416 also generates a plurality of expected output images showing the expected printed output using the analysis modules 417 for all printers installed in the analysis unit 416. After adding information enabling identifying which analysis module was used to produce each of the plural expected output images, the analysis unit 416 stores the result as expected print image 60 in memory 420.

In step S112 in FIG. 2, the calculation unit 314 calculates the cleaning count and the flushing count for all of the printers. Using the cleaning count, flushing count, and plural head shot counts contained in the shot count data 50, the calculation unit 314 then calculates ink consumption for each printer.

Figure 7:
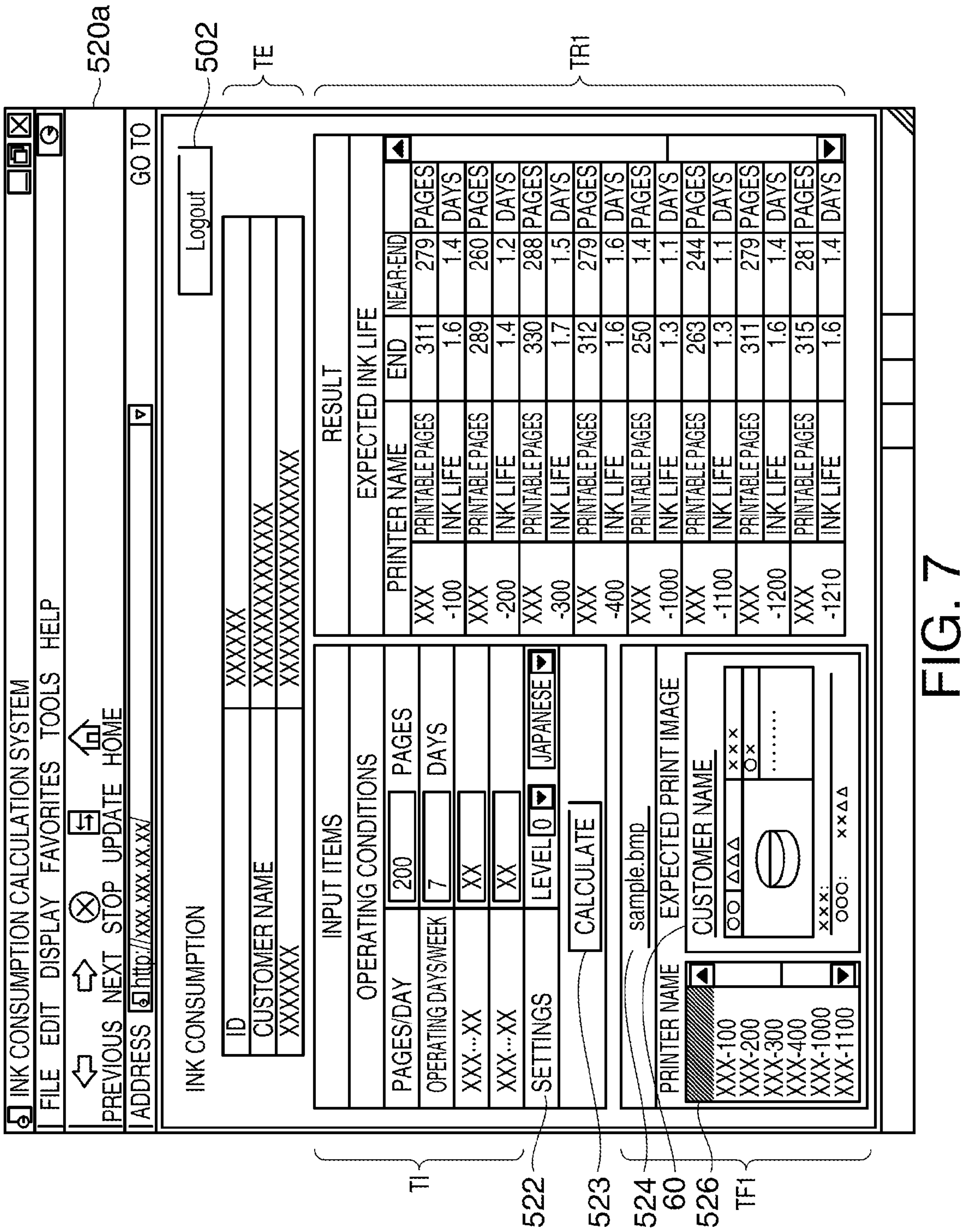
FIG. 7 shows an example of the consumption display window in the second embodiment of the invention.

FIG. 7 shows an example of a consumption display window 520*a* in the second embodiment of the invention. This display differs from that of the first embodiment shown in FIG. 5 in that image display field TF1 is rendered instead of the foregoing image display field TF, expected ink life display field TR1 is rendered instead of expected ink life display field TR, and the ink life per load display field TG is not provided, and other aspects of the configuration and operation are the same as in the first embodiment.

In addition to a base data link 524 and expected print image 60 display area, the image display field TF1 also has a printer name input field 526. The printer name input field 526 is a field for selecting the expected output image to be displayed in the expected print image 60 display field. The expected print image 60 corresponding to the printer selected by the printer name input field 526 is selected by the screen generator 312 and presented in the expected print image 60 display field.

Information about the amount of ink consumed in each printer that was calculated by the calculation unit 314 in step S112 in FIG. 2 is displayed in the expected ink life display field TR1. In the second embodiment shown in FIG. 7, ink consumption information is displayed for all of the printers that can be used in the ink consumption calculation system 10.

This configuration enables the user to view ink consumption information for all printers that can be used in the ink consumption calculation system 10 in a single list, and makes comparing printers based on ink consumption easier.

C. Other Variations

The invention is not limited to the foregoing embodiments and examples, and can be varied in many ways without departing from the scope of the accompanying claims. Some examples of such variations are described below.

C1. Variation 1

A preferred embodiment of the ink consumption calculation system 10 is described in the foregoing embodiments. The configuration of the ink consumption calculation device (or system) is not limited to the foregoing. For example, the front-end server 300 and back-end server 400 can be combined in a single server. The client PC 100 is also described as being a personal computer, but may, for example, be a portable terminal that can connect to a network.

C2. Variation 2

Examples of input/output windows (basic information input window 500, print conditions input window 510, consumption display window 520) that are displayed on the client PC 100 in the ink consumption calculation system 10 are described above. These windows are obviously simply examples, however, and other desired input/output items can be displayed without departing from the scope of the accompanying claims. For example, the number of input/output fields can be increased or decreased. Items that are selected from a drop-down list can also be input directly to text boxes. Yet further, configurations that display different printing condition input windows according to the type of printer selected in the basic information input window are also conceivable.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A fluid consumption calculation device that calculates consumption of a fluid by a fluid discharge device, wherein the fluid discharge device discharges fluid with a bidirectionally moving fluid discharge unit, the fluid consumption calculation device comprising:

an input unit that receives information related to an output object and a fluid discharge device operating condition, the operation condition comprising a time interval between fluid discharge device outputs;

a discharge control unit coupled to the input unit that generates fluid discharge data based on the output object information and the fluid discharge device operating condition;

an analysis unit coupled to the discharge unit that analyzes the discharge data to determine a fluid discharge unit roundtrip count for completing the output object;

a calculation unit coupled to the analysis unit that uses information acquired from the analysis unit to calculate consumption of the fluid used to form the output object, the calculation unit further configured to recalculate consumption of the fluid based on changing fluid discharge device operating conditions;

the fluid consumption calculation accounting for a cleaning and flushing count, the cleaning and flushing count being a function of the fluid discharge device, the fluid discharge unit roundtrip count for completing the output object, and time interval between outputs; and an output unit coupled to the calculation unit that generates and outputs output information using information acquired from the calculation unit, the output information including an expected output image representing a result expected when the output object is formed by the fluid discharge device.

2. The fluid consumption calculation device described in claim 1, wherein:

the discharge control unit generates discharge data of fluid used to form the output object for each of plural different fluid discharge devices; and the analysis unit analyzes the discharge data using analysis methods corresponding to each of the fluid discharge devices.

3. The fluid consumption calculation device described in claim 1, further comprising:

a command unit that instructs the discharge control unit to generate discharge data for the output object.

4. The fluid consumption calculation device described in claim 1, wherein:

the output object is an image.

5. The fluid consumption calculation device described in claim 1, wherein:

the discharge control unit includes a printer driver.

6. The fluid consumption calculation device of claim 1, wherein the output information further comprises a base data link.

7. A fluid consumption calculation system that calculates consumption of a fluid by a fluid discharge device, wherein the fluid discharge device discharges fluid with a bidirectionally moving fluid discharge unit, the fluid consumption calculation system comprising:

a first device including an input unit that receives information related to an output object and a fluid discharge device operating condition, the operation condition comprising a time interval between fluid discharge device outputs, a calculation unit that corresponds to the fluid discharge device, and calculates consumption of a fluid when forming the output object, the fluid consumption calculation accounting for a cleaning and flushing count, the cleaning and flushing count being a function of the fluid discharge device, a fluid discharge unit roundtrip count for completing the output object, and a time interval between outputs, and an output unit that generates and outputs output information using information acquired from the calculation unit, the output information including an expected output image representing a result expected when the output object is formed by the fluid discharge device; and a second device including a command unit that corresponds to the fluid discharge device and instructs generating discharge data of the fluid used to the output object, a discharge control unit that generates the discharge data based on a command from the command unit, the discharge control unit generates the discharge data based on the output object information and the fluid discharge device operating condition and an analysis unit that analyzes the discharge data to determine the fluid discharge unit roundtrip count for completing the output object;

wherein the first device sends received information related to the output object to the second device, and requests starting a process on the second device, the command unit of the second device instructs the discharge control unit to generate the discharge data based on the process start request, and the analysis unit analyzes the discharge data and sends the result to the first device, and the calculation unit of the first device that received the result of analysis calculates the fluid consumption using said analysis result.

8. The fluid consumption calculation system of claim 7, wherein the output information further comprises a base data link.

9. A fluid consumption calculation method that calculates consumption of a fluid by a fluid discharge device, wherein the fluid discharge device discharges fluid with a bidirectionally moving fluid discharge unit, the fluid consumption calculation method comprising steps of:

(a) receiving information related to an output object and a fluid discharge device operating condition, the operation condition comprising a time interval between fluid discharge device outputs;

(b) generating discharge data of a fluid for forming the output object by a fluid discharge device based on the output object information and the fluid discharge device operating condition;

(c) analyzing the discharge data to determine a fluid discharge unit roundtrip count for completing the output object;

(d) calculating consumption of fluid when the output object is formed using information acquired from analysis in step (c), the fluid consumption calculation accounting for a cleaning and flushing count, the cleaning and flushing count being a function of the fluid discharge device, the fluid discharge unit roundtrip count for completing the output object, and time interval between outputs; and (e) generating and outputting output information using information acquired from the calculation in step (d), the output information including an expected output image representing a result expected when the output object is formed by the fluid discharge device; and wherein at least one of steps (a)-(e) is performed using a computer processor.

10. The fluid consumption calculation method described in claim 9, wherein:

step (b) calculates discharge data of fluid used to form the output object for a plurality of different fluid discharge devices; and step (c) analyzes the discharge data using analysis methods corresponding to each of the fluid discharge devices.

11. The fluid consumption calculation method described in claim 9, wherein:

step (d) uses information acquired from the analysis step (c) to recalculate consumption of the fluid used to form the output object under the operating condition each time operating condition information is received; and step (e) re-generates the output information using information acquired by the recalculation.

12. The fluid consumption calculation method described in claim 9, wherein:

step (b) generates discharge data for the output object based on received command information.

13. The fluid consumption calculation method described in claim 9, wherein:

in step (e) the output information includes the output object.

14. The fluid consumption calculation method of claim 9, wherein the output information further comprises a base data link.

* * * * *